Dec. 16, 1952     E. REDIN ET AL     2,621,520
SAMPLING TUBE
Filed April 9, 1948     2 SHEETS—SHEET 1
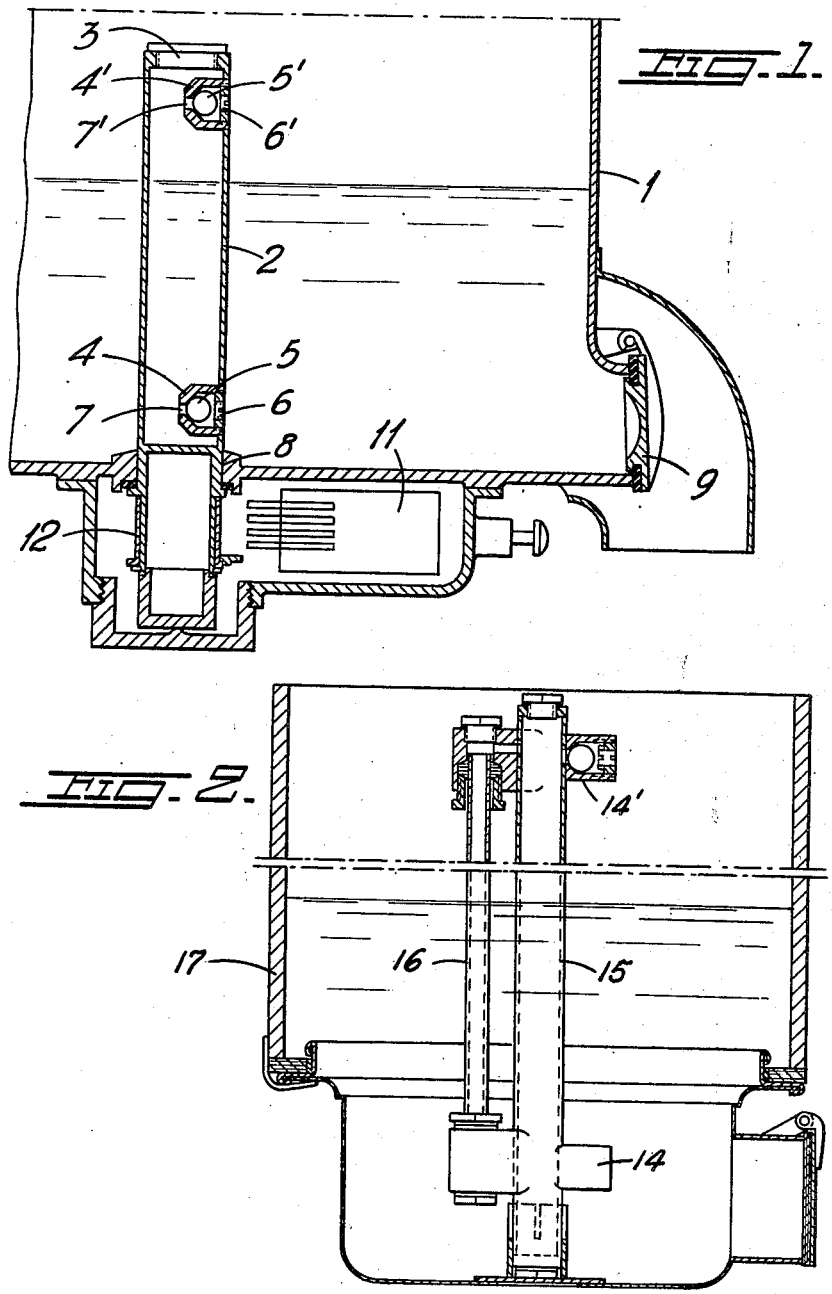

Dec. 16, 1952     E. REDIN ET AL     2,621,520
SAMPLING TUBE
Filed April 9, 1948     2 SHEETS—SHEET 2
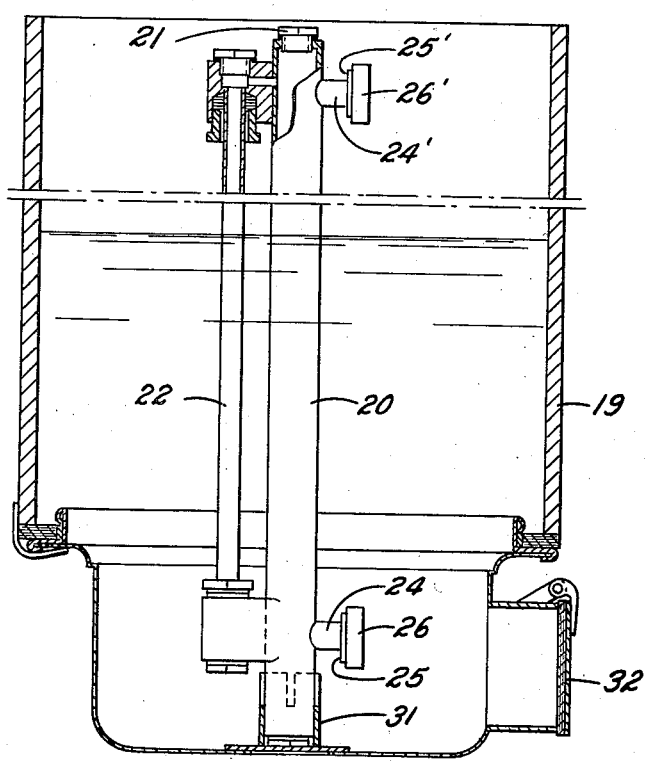
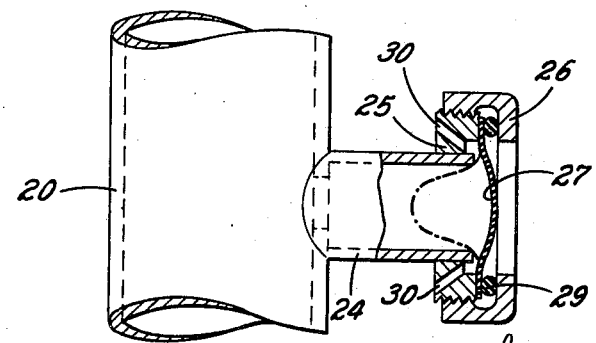

Patented Dec. 16, 1952

2,621,520

UNITED STATES PATENT OFFICE 2,621,520

SAMPLING TUBE

Eric Redin, Norrkoping, and Helge Ryde, Smedslatten, Sweden

Application April 9, 1948, Serial No. 20,144
In Sweden April 26, 1947

6 Claims. (Cl. 73—425.4)

The present invention relates to test tubes, particularly for obtaining samples of milk in connection with the performance of test milking operations by mechanical means. The test tube, however, may also be used for other purposes, where it is desired to obtain samples of liquids while positively preventing the tester from changing the nature or quantity of a sample by manipulations of any kind.

The test tube according to the invention is so constructed as to seal itself when a sample is taken and cannot again be sealed with this sample contained therein after said sealing is broken.

The invention is based on the assumption that the taking of the samples is carried out in an evacuated vessel in which the liquid to be tested is introduced and in which the test tube is located while the liquid is running into the vessel. The automatic sealing of the test tube is effected by means of a pair of valves controlled by the difference between the pressures existing inside and outside the test tube.

In a preferred embodiment of the invention said valves comprise balls or equivalent easily movable valve bodies loosely mounted in casings provided at or near the ends of the tube which communicate with the interior of the tube through ports formed in the wall of the tube and are provided with seats for the valve bodies in connection with said ports. With the pressure inside the tube equal to that outside thereof (inside the vessel), the valve bodies uncover said ports, allowing the liquid to freely enter the tube from the vessel through one port and the air to escape from inside the tube through the other port. Upon removal of the vacuum in the vessel the valve bodies are immediately forced against their seats closing the ports. The valve bodies remain in said position as long as a pressure below atmospheric exists above the liquid in the tube. The test tube may then be carried to the controlling station while positively preventing the sample contained in the tube from running out and, likewise, positively preventing the tester from changing the nature or quantity of the sample by any manipulations. If, for instance, any of the valves is opened by force, then also the other valve opens, thereby breaking the sealing and rendering it impossible to again close the valves except in connection with another testing operation.

In the accompanying drawing three embodiments of test tubes according to the invention are shown. Fig. 1 is a longitudinal section of a test tube according to one embodiment as inserted in a vessel, shown in a vertical section, the valves of the tube being shown in their closed state. Fig. 2 shows a test tube according to the second embodiment in a partially sectional elevation, as inserted in a vessel shown in a vertical section, the valves being shown in closed state. Fig. 3 is a longitudinal section of a vessel with a test tube according to the third embodiment shown in a partial sectional elevation. Fig. 4 shows a portion of this test tube on a larger scale with one of its valves shown in section.

With reference to Fig. 1, the numeral 1 designates a vessel to which liquid is supplied, for instance, from a test milking machine, while a more or less high degree of vacuum exists above the liquid in the vessel. Inserted in the vessel 1 is a vertical test tube 2 closed at both of its ends, in the example shown by a permanent bottom and a removal top plug 3, respectively. It is preferred to make the tube of glass but for manufacturing reasons it might be necessary to make it of a metal or alloy. Provided in the tube near the bottom end thereof is a valve casing 4 containing a loosely inserted ball 5 and communicating with the vessel 1 and the interior of the tube 2 through ports 6 and 7, respectively. The port 7 is formed as a seat for the ball 5.

A similar valve casing 4' containing a ball-shaped valve body 5' and formed with ports 6' and 7' is provided inside the tube 2 near the top thereof.

When inserted in the vessel 1, for instance, through an opening 8 in the bottom thereof, the test tube 2 is empty with the balls 5, 5' freely movable in their respective valve casings, as atmospheric pressure exists both inside and outside the tube. While the liquid is being filled into the vessel and rises therein, a certain vacuum is assumed to exist in the vessel, as for instance the same vacuum as exists in a milking machine, and said vacuum will, of course, also exist in the test tube 2. Even if the spherical valve bodies 5, 5' could be assumed to bear against their seats, they would immediately be removed therefrom under the action of the difference between the higher pressure inside the tube and the lower pressure in the vessel 1. The test tube is filled with liquid in unison with the filling of the vessel. As the supply of liquid to the vessel terminates and the vacuum in the vessel cease, for instance by uncovering a discharge port 9, the valves 5 and 5' due to the vacuum inside the test tube will be forced against their seats closing the ports 7 and 7', thereby securing a maintenance of the vacuum above the liquid in the tube and preventing the liquid therein from running out. Due to the vacuum in the tube the balls act as a seal. On unscrewing the plug 3 or removing any of the balls by force from its seat the vacuum immediately disappears and the balls fall off from their seats, thereby breaking the seal and allowing the liquid to flow out. There is thus no possibility of manipulating with the test tube in order to change the nature or quantity of the liquid. If in handing over the test tube to the respective controlling authority the valves of the tube are closed, this is an absolute guarantee that the sealing is intact and the sample the genuine one. To open the test tube for controlling purposes the plug 3 is unscrewed.

The embodiment shown in Fig. 2 differs from that above described by the feature that the valve casings 14 and 14' are provided outside the tube 15 instead of inside and the further feature that connected to the tube 15 is another tube 16 communicating at its top and bottom ends with the tube 15. Said tube 16 has no valves and is, preferably, made of glass. This allows making the tube 15 of metal which is desirable on account of the valves, while still permitting a visual control of the contents of liquid in the tube.

In Fig. 1 means are indicated for marking the test tube with a number or another sign, while the tube is in its place in the vessel. Such means may comprise a key operated counting mechanism 11 which stamps the number or sign on a strip 12 loosely put on a lower extension of the test tube.

A similar marking device may, of course, be provided also in connection with the tube shown in Fig. 2.

Hereinbefore, test tubes have been described which are especially adapted for receiving samples of milk as obtained from mechanical test milking of animals; the test tube, however, may also be used for other purposes where it is desired to obtain samples of liquids while positively preventing the tester from changing the nature or quantity of a sample taken with the tube. The test tube is so designed that after a sample is taken it will seal itself and after such seal has been broken cannot again be sealed, unless it is again placed in position in the vessel 1 or 17 and has received another sample of the liquid. In order to realize this operation, the taking of the samples takes place in an evacuated vessel in which the liquid to be tested is supplied and into which the test tube is inserted before the liquid is supplied to the vessel, the test tube being so positioned and connected to the vessel as to be filled in unison with the filling of the vessel, the automatic sealing being effected by means of a pair of valves controlled by the difference between the pressures inside and outside the tube. Said valves control ports provided at the opposite ends of the test tube in such a way that at an equal pressure inside the tube as that existing outside the tube the ports are open and allow free entrance of liquid from the vessel to the tube, while simultaneously permitting air contained in the tube to escape therefrom to the vessel, whereas an increase of the pressure inside the vessel above that existing in the tube will immediately cause the valves to cover the ports and remain in this position under the influence of the difference in pressure, and cannot again uncover the ports until after said difference in pressure is removed.

In the embodiments shown in Figs. 3 and 4 the lower and upper ports of the test tube are controlled by diaphragms.

The operation, however, is principally equal to that above described in connection with the embodiment having spherical valve bodies.

With reference to Fig. 3 the numeral 19 designates the vessel, to which the liquid to be tested is supplied, for instance, from a test milking machine, while a more or less high degree of vacuum is assumed to exist above the liquid in the vessel. Inserted in the vessel is a vertical test tube 20 which is closed at both ends, in the example shown by a permanent bottom at its lower end and by a removable screw plug 21 at its top end. The pipe 20 should, preferably, be transparent, as by glass, but from manufacturing point of view it may be necessary to make it of a metal or alloy. In the example shown it is assumed to be of metallic material. In such case it is combined with an observing tube 22 of glass which communicates at both ends with the metallic tube 20. Said metallic tube is provided with a laterally projecting branch pipe 24 or 24' at each end. Carried by each such branch pipe is a valve casing, comprising in the example shown a base ring 25 or 25' and a flanged ring 26 or 26' screwed on said base ring. Clamped between said two rings is the circumference of a diaphragm 27. An annular packing 29 provides a tight sealing between the diaphragm and the flanged ring 26. Said diaphragm is adapted, when forced inwards under the action of an external pressure, to engage the end of pipe 24 or 24' which thus acts as a valve seat between the interior of pipe 24 and passages bored in the base ring 25, as shown at 30 in Fig. 4.

In the example under consideration the operation is as follows:

When the test tube is inserted in its position in the vessel 19, as for instance, placed in a socket 31 provided on the bottom of the vessel, it must be empty, so that the diaphragms in the casings are in their normal position, as shown by full lines in Fig. 4, which position they occupy because the atmospheric pressure exists both inside and outside the tube. While the liquid to be tested, as milk, is running into the vessel 19, a certain degree of vacuum is assumed to be prevailing therein, as for instance, the vacuum used in connection with a milking machine. Said vacuum will, of course, also prevail within the tube 20 and the glass tube 22 in communication therewith. Even if the diaphragms were in contact with their seats for some reason when the vacuum commences, then they would immediately be removed therefrom under the action of the difference between the higher pressure in the test tube and the lower pressure in the vessel. The communicating tubes 20 and 22 are filled with liquid according as the liquid rises in the vessel 19, the liquid entering through the passages 30 in the lower valve casing, while the air escapes through the corresponding passages of the upper valve casing. When the supply of liquid to the vessel ceases and the vacuum in the vessel disappears, for instance, by opening the lid 32 so as to allow the liquid to run out from the vessel, then the diaphragms 27 are forced against their seats under the action of the atmospheric pressure in the vessel, while vacuum still exists in the tubes 20 and 22. By this means the connection between the pipes 24 and 24' on the one side and the respective channels 30 on the other side is cut off. As a result, the vacuum above the liquid inside the tube will remain and prevent the diaphragms from again leaving their seats. The diaphragms now are in the position indicated by dotted lines in Fig. 4. By the action of the vacuum in the tubes the diaphragms act as seals. By unscrewing the plug 21, or should any of the diaphragms be removed from its seat by force, then the vacuum inside the tubes 20 and 22 immediately disappears, so that also the other diaphragm falls back. Now the sealing is broken and the liquid runs out from the test tube. Any possibility of manipulating with a filled tube in order to change the nature or quantity of the smaple therein is, therefore, positively prevented. On delivering the test tube with a sample thereing and with the valves or diaphragms in closed state, to a controlling authority it is, therefore, absolutely true that the sample is untouched after filled into the tube in the way above described. When it is desired to empty the tube the plug 21 is unscrewed.

It is to be noted that modifications may be made without departing from the principle of the invention.

We claim:

1. In a device for taking samples of liquid from a vessel under filling by the action of a vacuum, the combination of a tubular body adapted to be placed in a vertical position in said vessel, said body being permanently closed at its bottom end and closeable at its top end, said tubular body having lateral openings adjacent its bottom and top ends, a valve casing rigidly connected to the tubular body at each such opening in such a way as to communicate on the one side with the interior of the tubular body and on the other side with the space surrounding said body, a valve member in each of said casings adapted to operate under the control of the difference between the pressures existing inside and outside the tubular body for controlling the communication between the interior and exterior of said tubular body.

2. A device as claimed in claim 1, and in which the lower valve has for its object to control the entrance of liquid into the tubular body, whereas the upper valve has for its object to control the effluence of air from the tubular body, the characteristic feature that the automatic valve bodies comprise balls freely moving inside the valve casings, each valve casing having a permanently open port for communication with the surroundings and another port controlled by the respective valve body for communication with the interior of the tubular body.

3. A device as claimed in claim 1, the further feature that the valve casings are provided inside the tubular body.

4. A device as claimed in claim 1, and in which the valve casings are provided outside the tubular body.

5. A device as claimed in claim 1, and in which the valve casings are provided outside the tubular body, the provision of a glass tube connected at its end to the ends of the tubular body so as to permanently communicate therewith at both ends for permitting a visual observation of the liquid level inside the tubular body.

6. A device as claimed in claim 1, and in which the valve casings are provided outside the tubular body, the further feature that the valves comprise diaphragms adapted to act under the influence of the difference between the pressures inside and outside the tubular body.

ERIC REDIN.
HELGE RYDE.

REFERENCES CITED

The following references are of record in the file of this patent:

UNITED STATES PATENTS

| Number | Name | Date |
| --- | --- | --- |
| 1,099,947 | Snyder | June 16, 1914 |
| 1,534,939 | Fuge | Apr. 21, 1923 |
| 1,603,429 | Uphaus et al. | Oct. 19, 1926 |
| 1,745,309 | Norris | Jan. 28, 1930 |
| 2,155,442 | Parkhurst | Apr. 25, 1939 |
| 2,333,711 | Dwiggins | Nov. 9, 1943 |

FOREIGN PATENTS

| Number | Country | Date |
| --- | --- | --- |
| 550,189 | Germany | May 6, 1932 |